(12) United States Patent
Mola

(10) Patent No.: US 10,949,332 B2
(45) Date of Patent: Mar. 16, 2021

(54) DATA RACE ANALYSIS BASED ON ALTERING FUNCTION INTERNAL LOADS DURING TIME-TRAVEL DEBUGGING

(71) Applicant: Microsoft Technology Licensing, LLC, Redmond, WA (US)

(72) Inventor: Jordi Mola, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 29 days.

(21) Appl. No.: 16/540,723

(22) Filed: Aug. 14, 2019

(65) Prior Publication Data

US 2021/0049090 A1 Feb. 18, 2021

(51) Int. Cl.
G06F 9/44 (2018.01)
G06F 11/36 (2006.01)

(52) U.S. Cl.
CPC ...... *G06F 11/3664* (2013.01); *G06F 11/3636* (2013.01); *G06F 11/366* (2013.01)

(58) Field of Classification Search
CPC .......................... G06F 11/3664; G06F 11/3636
See application file for complete search history.

(56) References Cited

U.S. PATENT DOCUMENTS

| | | | |
|---|---|---|---|
| 5,790,871 A | 8/1998 | Qureshi et al. | |
| 6,101,524 A | 8/2000 | Choi et al. | |
| 6,901,581 B1 | 5/2005 | Schneider | |
| 7,089,453 B2 | 8/2006 | Miyamoto | |
| 7,506,318 B1 | 3/2009 | Lindo et al. | |
| 8,468,501 B2 | 6/2013 | Subhraveti | |
| 9,280,346 B2 | 3/2016 | Farrell et al. | |
| 9,400,736 B2 | 7/2016 | Gainey, Jr. et al. | |
| 9,454,460 B2 | 9/2016 | Yang et al. | |
| 9,632,914 B2 | 4/2017 | Cheng et al. | |
| 10,133,653 B2 * | 11/2018 | O'Riordan | G06F 11/3636 |
| 10,248,549 B1 | 4/2019 | Davies | |
| 10,394,998 B2 | 8/2019 | Cummings et al. | |

(Continued)

OTHER PUBLICATIONS

"Non Final Office Action Issued in U.S. Appl. No. 16/460,113", dated Apr. 22, 2020, 45 Pages.

(Continued)

*Primary Examiner* — Jae U Jeon
(74) *Attorney, Agent, or Firm* — Workman Nydegger

(57) ABSTRACT

Determining whether a function-internal load modification affects the output of a traced function. A function is identified within a traced portion of a prior execution of an entity. The function comprises a sequence of executable instructions and produces one or more outputs. Traced output data value(s) that were produced by the traced instance of the function are determined, and an executable instruction within the sequence of executable instructions that performs a load from memory is identified. Execution of the function is emulated, while substituting a traced memory value loaded by the executable instruction during the traced instance of the function with a different memory value, and while producing emulated output data values(s). Based on there being a difference between the traced output data values(s) and the emulated output data values(s), a notification is generated at a user interface or to a software component.

20 Claims, 7 Drawing Sheets

(56) References Cited

U.S. PATENT DOCUMENTS

| | | | |
|---|---|---|---|
| 10,585,796 | B2 | 3/2020 | Daudel et al. |
| 2003/0033511 | A1 | 2/2003 | Akkary et al. |
| 2004/0221115 | A1 | 11/2004 | Sahin et al. |
| 2004/0243894 | A1 | 12/2004 | Smith et al. |
| 2006/0074622 | A1 | 4/2006 | Scott et al. |
| 2007/0083645 | A1 | 4/2007 | Roeck et al. |
| 2007/0198676 | A1 | 8/2007 | Vertes |
| 2007/0214171 | A1 | 9/2007 | Behnen et al. |
| 2007/0250820 | A1 | 10/2007 | Edwards et al. |
| 2008/0040093 | A1 | 2/2008 | Sargaison et al. |
| 2008/0097995 | A1 | 4/2008 | Dias et al. |
| 2008/0098207 | A1 | 4/2008 | Reid et al. |
| 2009/0133033 | A1 | 5/2009 | Lindo et al. |
| 2009/0248611 | A1 | 10/2009 | Xu et al. |
| 2010/0251031 | A1 | 9/2010 | Nieh et al. |
| 2010/0325359 | A1 | 12/2010 | Goel et al. |
| 2011/0264959 | A1 | 10/2011 | Subhraveti |
| 2012/0084759 | A1 | 4/2012 | Candea et al. |
| 2014/0289711 | A1 | 9/2014 | Usui |
| 2014/0350910 | A1 | 11/2014 | Talwadker et al. |
| 2015/0234730 | A1* | 8/2015 | Puthuff ............... G06F 11/3636 717/128 |
| 2016/0147649 | A1* | 5/2016 | Magdon-Ismail ......................... G06F 11/3414 711/118 |
| 2016/0292061 | A1 | 10/2016 | Marron et al. |
| 2016/0335172 | A1 | 11/2016 | Smith et al. |
| 2017/0161174 | A1 | 6/2017 | Daudel et al. |
| 2017/0286111 | A1 | 10/2017 | Pereira et al. |
| 2018/0032423 | A1 | 2/2018 | Bull et al. |
| 2018/0060213 | A1 | 3/2018 | Mola |
| 2018/0253369 | A1 | 9/2018 | O'dowd et al. |
| 2018/0300228 | A1 | 10/2018 | Beyel et al. |
| 2019/0042396 | A1 | 2/2019 | Mola |
| 2019/0147168 | A1 | 5/2019 | Kim et al. |
| 2019/0340103 | A1 | 11/2019 | Nelson et al. |
| 2020/0301808 | A1 | 9/2020 | Mola |
| 2020/0301809 | A1 | 9/2020 | Mola |
| 2020/0301812 | A1 | 9/2020 | Mola |
| 2020/0301813 | A1 | 9/2020 | Mola |
| 2020/0301815 | A1 | 9/2020 | Mola |
| 2020/0301820 | A1 | 9/2020 | Mola |
| 2020/0301821 | A1 | 9/2020 | Mola |

OTHER PUBLICATIONS

"Non Final Office Action Issued in U.S. Appl. No. 16/358,221", dated Mar. 30, 2020, 30 Pages.

"Non Final Office Action Issued in U.S. Appl. No. 16/459,879", dated Apr. 7, 2020, 65 Pages.

"Non Final Office Action Issued in U.S. Appl. No. 16/459,899", dated Apr. 17, 2020, 46 Pages.

"Non Final Office Action Issued in U.S. Appl. No. 16/358,194", dated Apr. 20, 2020, 62 Pages.

"Final Office Action Issued in U.S. Appl. No. 16/358,194", dated Oct. 5, 2020, 60 Pages.

"Final Office Action Issued in U.S. Appl. No. 16/459,879", dated Oct. 6, 2020, 68 Pages.

"Final Office Action Issued in U.S. Appl. No. 16/459,899", dated Oct. 5, 2020, 49 Pages.

"Final Office Action Issued in U.S. Appl. No. 16/460,113", dated Oct. 2, 2020, 45 Pages.

"Final Office Action Issued in U.S. Appl. No. 16/358,221", dated Oct. 5, 2020, 42 Pages.

Krena, et al., "Healing data races on-the-fly", In Proceedings of the ACM workshop on Parallel and distributed systems: testing and debugging, Jul. 9, 2007, pp. 54-64.

Narayanasamy, et al., "Automatically classifying benign and harmful data races using replay analysis", In Proceedings of the Conference on Programming Language Design and Implementation, Jun. 10, 2007, pp. 22-31.

"International Search Report and Written Opinion Issued in PCT Application No. PCT/US20/037103", dated Oct. 8, 2020, 15 Pages.

Godefroid, et al., "Automated Whitebox Fuzz Testing", In Proceedings of Network and Distributed System Security Symposium, Feb. 10, 2008, 16 Pages.

Hu, et al., "Fuzzy and Cross-App Replay for Smartphone Apps", In Proceedings of the 11th International Workshop on Automation of Software Test, May 14, 2016, pp. 50-56.

"International Search Report and Written Opinion Issued in PCT Application No. PCT/US20/022206", dated Jul. 6, 2020, 14 Pages.

"International Search Report and Written Opinion Issued in PCT Application No. PCT/US20/022210", dated Jul. 7, 2020, 13 Pages.

Prahofer, et al., "A Comprehensive Solution for Deterministic Replay Debugging of SoftPLC Applications", In Proceedings of IEEE Transactions on Industrial Informatics, vol. 7 , Issue: 4, Sep. 6, 2011, pp. 641-651.

Schatz, et al., "Analyzing Long-Running Controller Applications for Specification Violations Based on Deterministic Replay", In Proceedings of 38th Euromicro Conference on Software Engineering and Advanced Applications, Sep. 5, 2012, pp. 55-62.

Viennot, et al., "Transparent Mutable Replay for Multicore Debugging and Patch Validation", In Proceedings of ACM SIGARCH Computer Architecture News, Mar. 16, 2013, pp. 127-138.

"Non Final Office Action Issued in U.S. Appl. No. 16/541,647", dated Nov. 4, 2020, 69 pages.

"Non Final Office Action Issued in U.S. Appl. No. 16/552,143", dated Nov. 4, 2020, 101 pages.

* cited by examiner

100b

Debugging *109*

- Data Access *114*
  - Trace Access *114a*
  - Code Access *114b*

- Trace/Code Analysis *115*
  - Function Identification *115a*
  - Inputs/Outputs Identification *115b*
  - Load Identification *115c*
  - Load Value Identification *115d*

- Emulation *116*
  - Emulation Steering *116a*
  - Load Substitution *116b*
  - Output Generation *116c*

- Emulation Analysis *117*
  - Outputs Comparison *117a*
  - Data Race Analysis *117b*
  - Classification *117c*
  - Checker *117d*

- Output *118*

*FIG. 1B*

DATA RACE ANALYSIS BASED ON ALTERING FUNCTION INTERNAL LOADS DURING TIME-TRAVEL DEBUGGING

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors might be triggered by a vast variety of factors such as data inputs, user inputs, data races (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause(s).

When developing multi-threaded applications, identifying and fixing data races can be especially time-consuming and difficult. A data race occurs when a multiple threads access the same memory location, and in which at least one thread writes to the memory location without carefully controlling the ordering of execution of those threads. Thus, for example, a first thread might write to a memory location when a second thread is not expecting it, thus causing the second thread to read an invalid or unexpected value from the memory location. A data race might occur, for example, due to careless thread synchronization when intentionally using shared memory (e.g., a global variable, a heap allocation, etc.), or due to a thread inadvertently writing to shared memory (e.g., using a rogue pointer, using an improper offset from an otherwise valid pointer, etc.). Data races can be difficult to identify because they can be unreliable to reproduce—their occurrence (or lack thereof) can come down the timing of how the execution of multiple threads is interleaved—which timing can vary over time depending on the workload of each thread, the timing characteristics of accesses to memory and other input/output devices, the overall workload of a processor, particular user input, etc.

Developers have conventionally used a variety of approaches to identify undesired software behaviors, and to then identify the location(s) in an application's code that cause the undesired software behavior. For example, a developer might test different portions of an application's code against different inputs (e.g., unit testing). As another example, a developer might reason about execution of an application's code in a debugger (e.g., by setting breakpoints/watchpoints, by stepping through lines of code, etc. as the code executes). As another example, a developer might observe code execution behaviors (e.g., timing, coverage) in a profiler. As another example, a developer might insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of a program's thread(s) is recorded into one or more trace files (i.e., a recorded execution). Using some tracing techniques, a recorded execution can contain "bit-accurate" historic trace data, which enables the recorded portion(s) the traced thread(s) to be virtually "replayed" down to the granularity of individual instructions (e.g., machine code instructions, intermediate language code instructions, etc.). Thus, using "bit-accurate" trace data, diagnostic tools can enable developers to reason about a recorded prior execution of subject code, as opposed to a "live" forward execution of that code. For example, a historic debugger might enable both forward and reverse breakpoints/watch points, might enable code to be stepped through both forwards and backwards, etc. A historic profiler, on the other hand, might be able to derive code execution behaviors (e.g., timing, coverage) from prior-executed code.

BRIEF SUMMARY

At least some embodiments described herein leverage historic debugging technologies to substitute the value of a load within a function during the functions' replay, in order to observe the effect of the substitution on the function's output(s). Thus, in accordance with embodiments herein, when emulating execution of a given function, an emulator is able to modify one or more memory values read by the function, and then compare the function's emulated behavior to traced behavior. In embodiments, a debugger uses this comparison to determine if a memory race occurred (or likely occurred) during tracing of the function, and/or to identify potential effects of a memory race. In embodiments, the debugger can perform this analysis whether or not a data race actually occurred during tracing.

For example, modifying the value read by a given load might operate to simulate the occurrence of a data race. Thus, the debugger can observe effects a simulated data race might have on the behavior of a function (e.g., based on the value(s) of the function's output(s) after simulating the data race), even when a data race did not actually occur during tracing. As such, the debugger can enable simulation of a data race in a function when a race might be suspected, but has not been captured during tracing. Alternatively, modifying the value read by a given load might operate to simulate the correction of a data race. Thus, the debugger can observe the effects of a simulated correction of a data race might have on the behavior of a function (e.g., based on the value(s) of the function's output(s) after simulating correction of the data race) when a data race was captured during tracing.

In some embodiments methods, systems, and computer program products use a recorded execution to determine whether a function-internal load modification affects one or more outputs of a traced function. In these embodiments, a computer system accesses a recorded execution comprising trace data tracing a prior execution of at least a portion of executable code of an executable entity. The trace data enables replay of the prior execution the portion of the executable entity. The computer system identifies a function within the traced portion of executable code of the executable entity. The function comprises a sequence of executable instructions, which consume zero or more inputs and produce one or more outputs. Based on the trace data, the computer system determines one or more traced output data values that were produced by a traced instance of the function during the prior execution. The computer system identifies, within the sequence of executable instructions of the function, at least one executable instruction that performs a load from memory. The computer system emulates execution of the function in reliance on the trace data. The emulation includes substituting a traced memory value loaded by the at least one executable instruction during the traced instance of the function with a different memory value, and producing one or more emulated output data values for the one or more outputs. The computer system determines if there is a difference between the one or more traced output data values and the one or more emulated output data values. Based on there being a difference between the one or more traced output data values and the one or more emulated output data values, the computer system generates a notification at a user interface or to a software component.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1B illustrates an example debugging component;

DETAILED DESCRIPTION

Figure 1A:
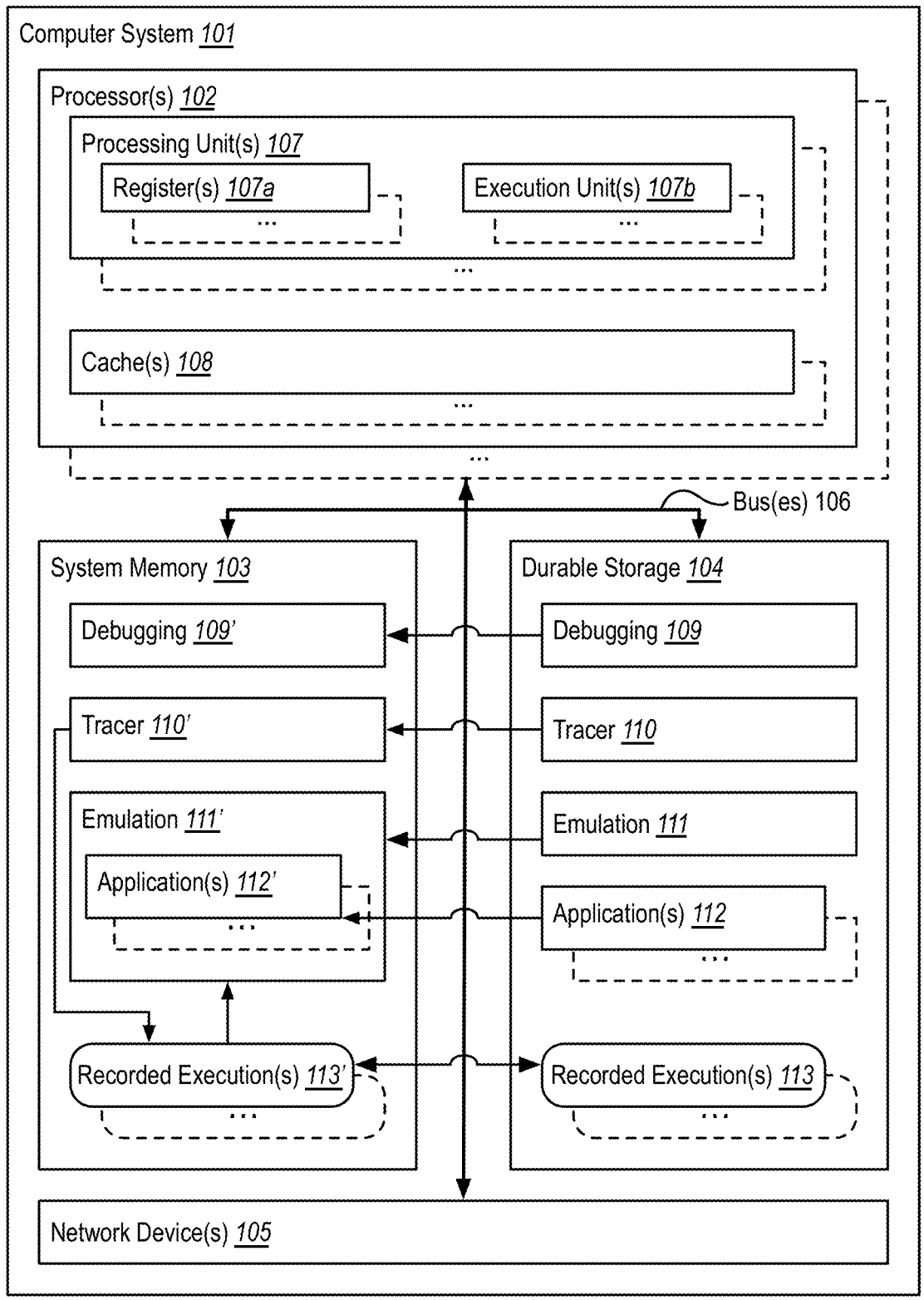
FIG. 1A illustrates an example computing environment that facilitates using a recorded execution to determine whether a function-internal load modification affects the output of a traced function.

At least some embodiments described herein leverage historic debugging technologies to substitute the value of a load within a function during the functions' replay, in order to observe the effect of the substitution on the function's output(s). Thus, in accordance with embodiments herein, when emulating execution of a given function, an emulator is able to modify one or more memory values read by the function, and then compare the function's emulated behavior to traced behavior. In embodiments, a debugger uses this comparison to determine if a memory race occurred (or likely occurred) during tracing of the function, and/or to identify potential effects of a memory race. In embodiments, the debugger can perform this analysis whether or not a data race actually occurred during tracing.

For example, modifying the value read by a given load might operate to simulate the occurrence of a data race. Thus, the debugger can observe effects a simulated data race might have on the behavior of a function (e.g., based on the value(s) of the function's output(s) after simulating the data race), even when a data race did not actually occur during tracing. As such, the debugger can enable simulation of a data race in a function when a race might be suspected, but has not been captured during tracing. Alternatively, modifying the value read by a given load might operate to simulate the correction of a data race. Thus, the debugger can observe the effects of a simulated correction of a data race might have on the behavior of a function (e.g., based on the value(s) of the function's output(s) after simulating correction of the data race) when a data race was captured during tracing.

As will be appreciated by one of skill in the art, substituting the value of a load within a function during the functions' replay, and observing the effect of the substitution on the function's output(s) can provide a number of technical benefits. For instance, it can be very difficult to reproduce data races during testing. In addition, even if a data race occurs in production, that data race may not be reproducible during tracing due to changes in the execution timing characteristics introduced by the tracing. Thus, even though a program error occurs that might be suspected as a data race, it may be difficult, or even impossible to capture a trace of that data race. The embodiments herein provide tools that enable suspected data races to be simulated. Based on simulation of a data race, a suspected data race might be confirmed, greatly simplifying the process of pinpointing the root cause of the data race. In addition, even if a data race has occurred during tracing, it might be unclear if a data race actually occurred. By simulating correction of a data race and observing the resulting behavior, data race confirmation can be greatly simplified. Additionally, even if a data race has occurred during tracing, it might be unclear what effects correcting the data race might have. By simulating correction of a data race these effects can be observed via emulation—even before producing a code fix. The net effect of these technical benefits is the production of less error-prone code, with reduced time spent in development, troubleshooting, and debugging.

As indicated, the embodiments herein operate on recorded executions of executable entities. In this description, and in the following claims, a "recorded execution," can refer to any data that stores a record of a prior execution of code instruction(s), or that can be used to at least partially reconstruct the prior execution of the prior-executed code instruction(s). In general, these code instructions are part of an executable entity, and execute on physical or virtual processor(s) as threads and/or processes (e.g., as machine code instructions), or execute in a managed runtime (e.g., as intermediate language code instructions).

A recorded execution used by the embodiments herein might be generated by a variety of historic debugging technologies. In general, historic debugging technologies record or reconstruct the execution state of an entity at various times, in order to enable execution of that entity to be at least partially emulated later from that execution state. The fidelity of that virtual execution varies depending on what recorded execution state is available.

For example, one class of historic debugging technologies, referred to herein as time-travel debugging, continuously records a bit-accurate trace of an entity's execution. This bit-accurate trace can then be used later to faithfully replay that entity's prior execution down to the fidelity of individual code instructions. For example, a bit-accurate trace might record information sufficient to reproduce initial processor state for at least one point in a thread's prior execution (e.g., by recording a snapshot of processor registers), along with the data values that were read by the thread's instructions as they executed after that point in time (e.g., the memory reads). This bit-accurate trace can then be used to replay execution of the thread's code instructions (starting with the initial processor state) based on supplying the instructions with the recorded reads.

Another class of historic debugging technology, referred to herein as branch trace debugging, relies on reconstructing at least part of an entity's execution state based on working backwards from a dump or snapshot (e.g., a crash dump of a thread) that includes a processor branch trace (i.e., which includes a record of whether or not branches were taken). These technologies start with values (e.g., memory and register) from this dump or snapshot and, using the branch trace to at least partially determine code execution flow, iteratively replay the entity's code instructions and backwards and forwards in order to reconstruct intermediary data values (e.g., register and memory) used by this code until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as replay and snapshot debugging, periodically records full snapshots of an entity's memory space and processor registers while it executes. If the entity relies on data from sources other than the entity's own memory, or from a non-deterministic source, these technologies might also record such data along with the snapshots. These technologies then use the data in the snapshots to replay the execution of the entity's code between snapshots.

FIG. 1A illustrates an example computing environment 100a that facilitates using a recorded execution to determine whether a function-internal load modification affects the output of a traced function which can, for example, be useful for data race analysis. As depicted, computing environment 100a may comprise or utilize a special-purpose or general-purpose computer system 101, which includes computer hardware, such as, for example, one or more processors 102, system memory 103, durable storage 104, and/or network device(s) 105, which are communicatively coupled using one or more communications buses 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network device(s) 105), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, each processor 102 can include (among other things) one or more processing units 107 (e.g., processor cores) and one or more caches 108. Each processing unit 107 loads and executes machine code instructions via the caches 108. During execution of these machine code instructions at one more execution units 107b, the instructions can use internal processor registers 107a as temporary storage locations and can read and write to various locations in system memory 103 via the caches 108. In general, the caches 108 temporarily cache portions of system memory 103; for example, caches 108 might include a "code" portion that caches portions of system memory 103 storing application code, and a "data" portion that caches portions of system memory 103 storing application runtime data. If a processing unit 107 requires data (e.g., code or application runtime data) not already stored in the caches 108, then the processing unit 107 can initiate a "cache miss," causing the needed data to be fetched from system memory 103—while potentially "evicting" some other data from the caches 108 back to system memory 103.

As illustrated, the durable storage 104 can store computer-executable instructions and/or data structures representing executable software components; correspondingly, during execution of this software at the processor(s) 102, one or more portions of these computer-executable instructions and/or data structures can be loaded into system memory 103. For example, the durable storage 104 is shown as storing computer-executable instructions and/or data structures corresponding to a debugging component 109, a tracer component 110, an emulation component 111, and one or more application(s) 112. The durable storage 104 can also store data, such as one or more recorded execution(s) 113 (e.g., generated using one or more of the historic debugging technologies described above).

In general, the debugging component 109 leverages the emulation component 111 in order to emulate execution of code of executable entities, such as application(s) 112, based on execution state data obtained from one or more of the recorded execution(s) 113. Thus, FIG. 1A shows that the debugging component 109 and the emulation component 111 are loaded into system memory 103 (i.e., debugging component 109' and emulation component 111'), and that the application(s) 112 are being emulated within the emulation component 111' (i.e., application(s) 112').

In general, the tracer component 110 records or "traces" execution of one or more of application(s) 112 into the recorded execution(s) 113 (e.g., using one or more types of the historic debugging technologies described above). The tracer component 110 can record execution of application(s) 112 whether that execution be a "live" execution on the processor(s) 102 directly, whether that execution be a "live" execution on the processor(s) 102 via a managed runtime, and/or whether that execution be an emulated execution via the emulation component 111. Thus, FIG. 1A also shows that the tracer component 110 is also loaded into system memory 103 (i.e., tracer component 110'). An arrow between tracer component 110' and recorded execution(s) 113' indicates that the tracer component 110' can record trace data into recorded execution(s) 113' (which might then be persisted to the durable storage 104 as recorded execution(s) 113).

Figure 2:
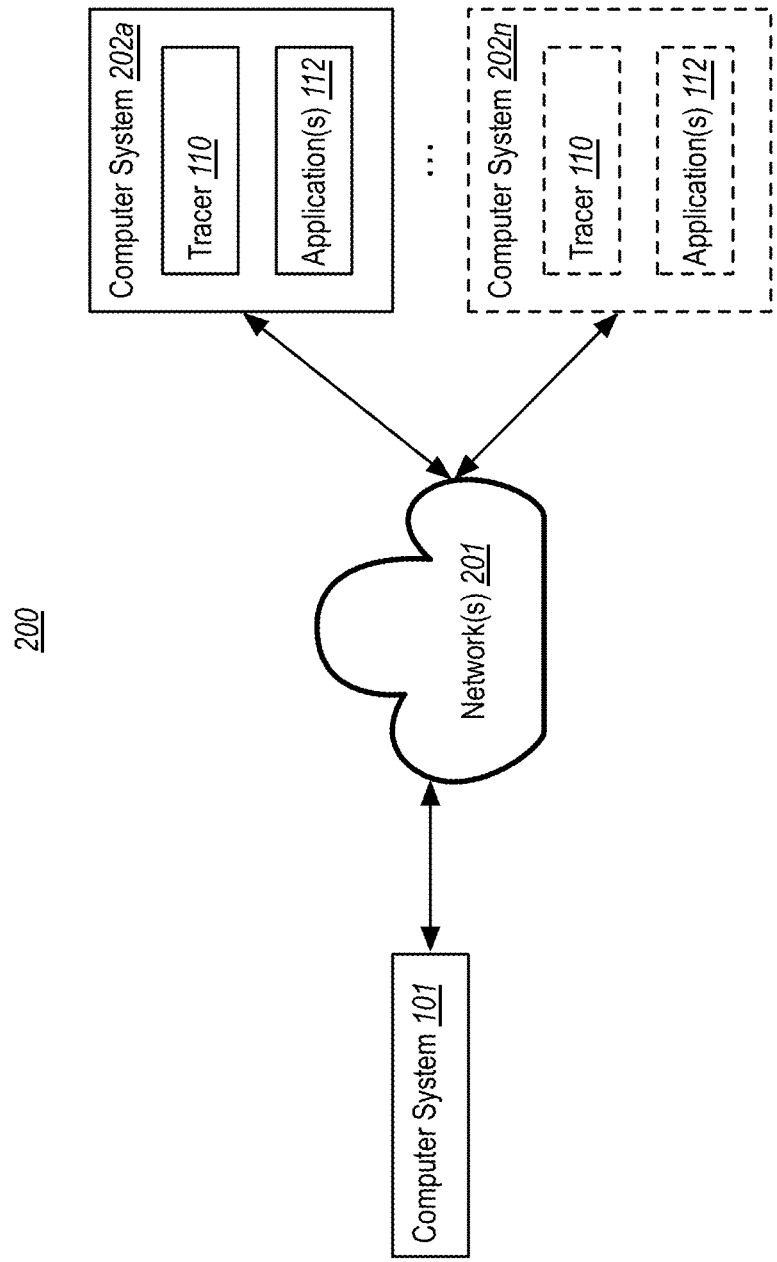
FIG. 2 illustrates an example computing environment in which the computer system of FIG. 1A is connected to one or more other computer systems over one or more networks.

Computer system 101 might additionally, or alternatively, receive one or more of the recorded execution(s) 113 from another computer system (e.g., using network device(s) 105). For example, FIG. 2 illustrates an example computing environment 200 in which computer system 101 of FIG. 1A is connected to one or more other computer systems 202 (i.e., computer systems 202a-202n) over one or more networks 201. As shown in example 200, each computer system 202 includes a tracer component 110 and application(s) 112. As such, computer system 101 may receive, over the network(s) 201, one or more recorded execution(s) 113 of prior execution(s) of one or more of application(s) 112 at these computer system(s) 202.

It is noted that, while the debugging component 109, the tracer component 110, and/or the emulation component 111 might each be independent components or applications, they might alternatively be integrated into the same application (such as a debugging suite), or might be integrated into another software component—such as an operating system component, a hypervisor, a cloud fabric, etc. As such, those skilled in the art will also appreciate that the invention may be practiced in a cloud computing environment of which computer system 101 is a part.

It was mentioned previously that the debugging component 109 leverages the emulation component 111 in order to emulate execution of code of one or more of application(s) 112 using execution state data from one or more of the recorded execution(s) 113. In accordance with embodiments herein, when emulating execution of a given application 112, the debugging component 109 is able to modify one or more memory values read by the application 112, and then compare the emulated behavior to traced behavior. Based on this comparison, the debugging component 109 can determine if a memory race occurred (or likely occurred) during a recorded execution of the application 112 and/or identify potential effects of a memory race, whether or not one actually occurred during tracing. In embodiments, modifying the memory value might operate to simulate the occurrence of a memory race (e.g., when a race might be suspected but has not been captured during tracing), or to simulate the effects of correcting a memory race (e.g., when a race was captured during tracing). As will be explained, the embodiments herein might be usable to detect a memory race (or likely memory race) even when execution of an entity causing the memory race was not traced into the recorded execution(s) 113. In embodiments, the debugging component 109 can also leverage the tracer component 110 to record this emulated execution into the recorded executions 113 for a further historic debugging analysis (e.g., by adding additional trace data to an existing recorded execution 113, and/or by creating a new recorded execution 113).

To demonstrate how the debugging component 109 might accomplish the foregoing, FIG. 1B illustrates an example 100b that provides additional detail of the debugging component 109 of FIG. 1A. The depicted debugging component 109 in FIG. 1B includes a variety of components (e.g., data access 114, trace/code analysis 115, emulation 116, emulation analysis 117, output 118, etc.) that represent various functions that the debugging component 109 might implement in accordance with various embodiments described herein. It will be appreciated that the depicted components—including their identity, sub-components, and arrangement—are presented merely as an aid in describing various embodiments of the debugging component 109 described herein, and that these components are non-limiting to how software and/or hardware might implement various embodiments of the debugging component 109 described herein, or of the particular functionality thereof.

Figure 3:
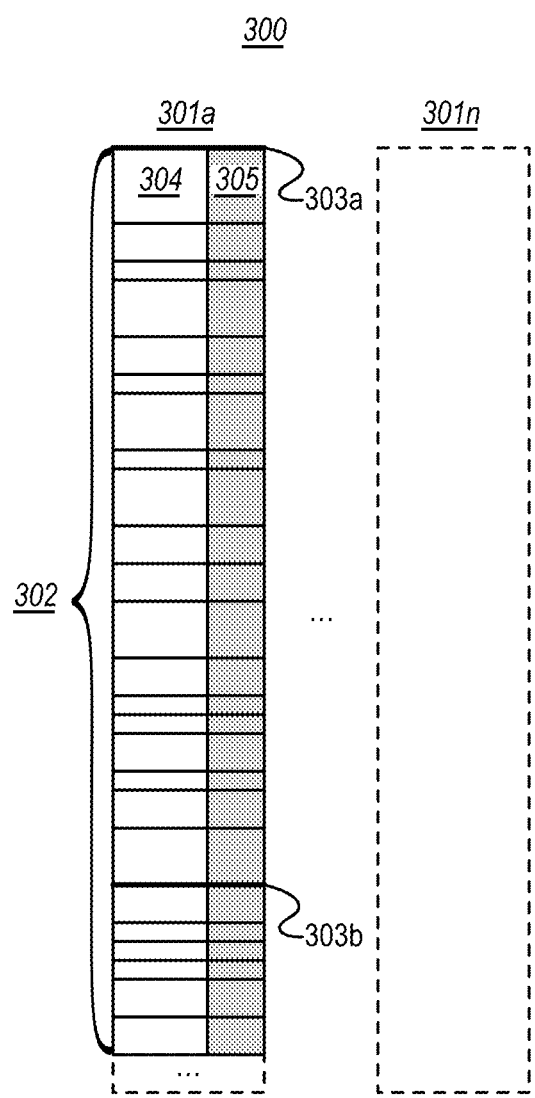
FIG. 3 illustrates an example of a recorded execution of an executable entity.

As shown, the data access component 114 includes a trace access component 114a and a code access component 114b. The trace access component 114a accesses one or more of the recorded execution(s) 113, such as a recorded execution 113 of a prior execution of application 112. FIG. 3 illustrates one example of a recorded execution 300 of an executable entity (e.g., application 112) that might be accessed by the trace access component 114a, where the recorded execution 300 might have been generated using time-travel debugging technologies.

In the example of FIG. 3, recorded execution 300 includes a plurality of data streams 301 (i.e., data streams 301a-301n). In embodiments, each data stream 301 records execution of a different thread that executed from the code of an application 112. For example, data stream 301a might record execution of a first thread of application 112, while data stream 301n records an $n^{th}$ thread of application 112. As shown, data stream 301a comprises a plurality of data packets 302. Since the particular data logged in each data packet 302 might vary, they are shown as having varying sizes. In general, when using time-travel debugging technologies, each data packet 302 records at least the inputs (e.g., register values, memory values, etc.) to one or more executable instructions that executed as part of this first thread of application 112. As shown, data stream 301a might also include one or more key frames 303 (e.g., key frames 303a and 303b) that each records sufficient information, such as a snapshot of register and/or memory values, that enables the prior execution of the thread to be replayed by the emulation component 116, starting at the point of the key frame onward.

In embodiments, a recorded execution 113 might also include the actual code that was executed as part of an application 112. Thus, in FIG. 3, each data packet 302 is shown as including a non-shaded data inputs portion 304 and a shaded code portion 305. In embodiments, the code portion 305 of each data packet 302, if present, might include the executable instructions that executed based on the corresponding data inputs. In other embodiments, however, a recorded execution 113 might omit the actual code that was executed, instead relying on having separate access to the code of the application 112 (e.g., from durable storage 104). In these other embodiments, each data packet may, for example, specify an address or offset to the appropriate executable instruction(s) in an application binary image. Although not shown, it may also be possible that the recorded execution 300 includes a data stream 301 that stores one or more of the outputs of code execution.

If there are multiple data streams 301, each recording execution of a different thread, these data streams might include sequencing events. Each sequencing event records the occurrence of an event that is orderable across the threads. For example, sequencing events might correspond to interactions between the threads, such as accesses to memory that is shared by the threads. Thus, for instance, if a first thread that is traced into a first data stream (e.g., 301a) writes to a synchronization variable, a first sequencing event might be recorded into that data stream (e.g., 301a). Later, if a second thread that is traced into a second data stream (e.g., 301b) reads from that synchronization variable, a second sequencing event might be recorded into that data stream (e.g., 301b). These sequencing events might be inherently ordered. For example, each sequencing event might be associated with a monotonically incrementing value, with the monotonically incrementing values defining a total order among the sequencing events. For instance, a first sequencing event recorded into a first data stream might be given a value of one, a second sequencing event recorded into a second data stream might be given a value of two, etc.

Returning to FIG. 1B, the code access component 114b might obtain the code of application 112. If the recorded execution(s) 114 obtained by the trace access component 114a included the traced code (e.g., code portion 305), then the code access component 114b might extract that code from a recorded execution 113. Alternatively, the code access component 114b might obtain the code of application 112 from the durable storage 104 (e.g., from an application binary image).

The trace/code analysis component 115 can perform one or more types of analysis on a recorded execution 113 and/or an application 112 that was accessed by the data access component 114 that facilitates, during emulation of a recorded execution of application 112, modifying memory value(s) that were previously read by the application 112. This data modification could be used, for example, as part of a data race analysis. As an aid in describing possible types of analysis, the trace/code analysis component 115 is shown as potentially including a function identification component 115a, an inputs/outputs identification component 115b, and a load identification component 115c.

Figure 4:
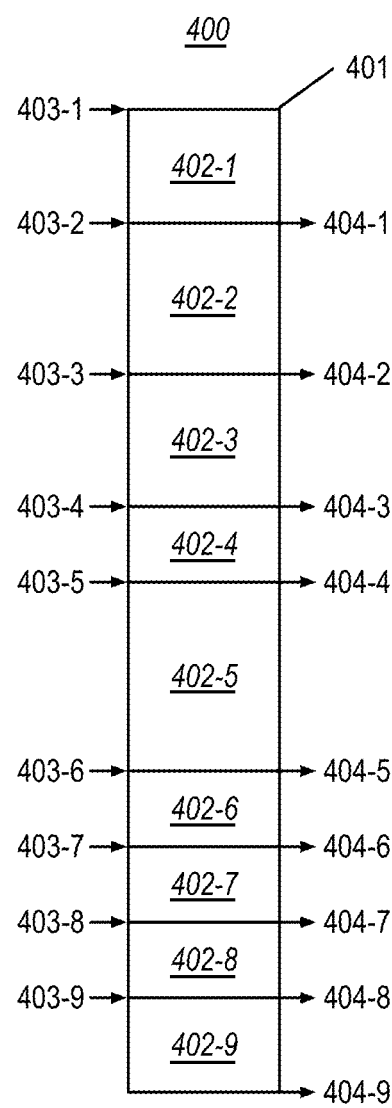
FIG. 4 illustrates an example of functions in an executable entity, in which the functions are identified based on their inputs and outputs.

In embodiments, the function identification component 115a identifies discrete "functions" in the code of a subject application 112. In embodiments, the function identification component 115a might identify these functions based on identifying inputs to and outputs from those functions. As used herein, a "function" is defined as a collection of one or more sections of executable code, each section comprising a sequence of one or more executable instructions that has zero or more "inputs" and one or more "outputs." For example, FIG. 4 illustrates an example 400 of functions in an executable entity, in which the functions are identified based on their inputs and outputs. In particular, FIG. 4 shows a representation 401 of the code of an application 112. FIG.

4 also shows different sections of execution are identified in the representation 401 as different functions (i.e., functions 402, including functions 402-1 through 402-9). Each of these functions 402 might have a distinct set of zero or more inputs and a distinct set one or more outputs. For example, in FIG. 4, each function 402 has a corresponding set of input(s) 403 and a corresponding set of output(s) 404. Function 402-1, for instance, has a set of input(s) 403-1 and a set of outputs 404-1, function 402-2 has a set of input(s) 403-2 (which could potentially correspond to set of outputs 404-1) and a set of outputs 404-2, etc. Thus, in connection with the function identification component 115a identifying functions, the inputs/outputs identification component 115b can identify corresponding inputs and outputs.

While the scope of an identified function might vary, in embodiments the function identification component 115a might identify functions based on identifying basic blocks in application 112. As will be appreciated by one of ordinary skilling the relevant art, and as used herein, a "basic block" is a sequence of instructions that are an execution unit; that is, the sequence has a single input point and a single output point, and all or none of the instructions in the basic block either execute or do not execute (exceptions aside). Thus, in embodiments, a "function" might comprise a single basic block, though a function might alternatively comprise a plurality of basic blocks.

As used herein, an "input" is defined as any data location from which a function (as defined above) reads, and to which the function itself has not written prior to the read. These data locations could include, for example, registers as they existed the time the function was entered, and/or any memory location from which the function reads and which it did not itself allocate. An edge case may arise if a function allocates memory and then reads from that memory prior to initializing it. In these instances, embodiments might either treat the read to uninitialized memory as an input, or as a bug. As used herein, an "output" is defined as any data location (e.g., register and/or memory location) to which the function writes that it does not later deallocate. For example, a stack allocation at function entry, followed by a write to the allocated area, followed by a stack deallocation at function exit, would not be considered a function output. In addition, if a function is delimited by application binary interface (ABI) boundaries, then any volatile registers (i.e., registers not used to pass a return value) at function exit are implicitly "deallocated" (i.e., they are discarded by the ABI)—and are thus not outputs for the function.

In embodiments, the function identification component 115a might rely a known ABI of the operating system and processor instruction set architecture (ISA) for which application(s) 112 are compiled in order to know which register(s) are input(s) to a function and/or which register(s) are output(s) from a function—reducing the need to track registers individually. Thus, for instance, instead of tracking registers individually, the function identification component 115a might use an ABI for which application(s) 112 were compiled to determine which register(s) the application(s) 112 use to pass parameters to functions, and/or which register(s) the application(s) 112 use for return values. In embodiments, debugging symbols might be used to complement, or replace ABI information. Notably, even if calling function ignores the return value of a called function, an ABI and/or symbols may still be usable to determine if the contents of a register used to store the called function's return value have changed.

In embodiments, it may be possible for the function identification component 115a to define and map functions that include sequences of instructions that have one or more gaps within their execution. For example, a function might include a sequence of instructions that make a kernel call—which might not be recorded—in the middle of their execution. To illustrate, function 402-1 might take as input a file handle and a character, and include instructions that compare each byte of the file with the input character to find occurrences of the character in the file. Because they rely on file data, these instructions might make one or more kernel calls (not shown) to read the file (e.g., using the handle as a parameter to the kernel call). In order to identify functions with gaps, the function identification component 115a may need to ensure that these gaps are properly ordered within each function with respect to the comparison operations, so the file data is processed in the same order in each function. It is noted that, in embodiments, any register values changed by a kernel call would typically be tracked in the recorded execution(s) 113. Nonetheless, the function identification component 115a might additionally, or alternatively, use an ABI and/or debugging symbols to track which registers values are retained across a kernel call. For instance, the stack pointer (i.e., ESP on x86 or R13 on ARM) may be retained across kernel calls.

In embodiments, inputs and outputs are composable. For example, if a single function in an application 112 is inclusively defined as the entirety of the code in section A, B, and C, then this function's set of inputs might be defined as an input set including the combination of each of the inputs of section A, B, And C, and its set of outputs might be defined as an output set including the combination of each of the outputs of section A, B, and C. It will be appreciated that when an input (or output) to section B is allocated by (or de-allocated by) section A, or if it is allocated by section B and de-allocated by section A, then that input (or output) to function B may be omitted from the input set (or output set). It will also be appreciated that any input (or output) of a section called within a broader function (i.e., that includes the section), and which is not an input (or output) of the broader function may be omitted from an input set (or output set) for the broader function, or may otherwise be tracked as internal to the broader function.

Complications might also arise due to function inlining, particularly when a child function is not going to be analyzed by the debugging component 109 (e.g., because it comes from a third-party library). For instance, suppose that a first section (A1) of function A executes prior to calling child function B, and then a second section (A2) of function A executes after function B returns. Here, sections A1 and A2 might be treated as independent functions, themselves, with their own sets of inputs and outputs. If function B takes as inputs any of the outputs of A1, those outputs need to be produced before calling into function B; similarly, if function A2 takes as inputs any of the outputs of function B, then those outputs need to appear after the invocation of function B.

In embodiments, the inputs/outputs identification component 115b identifies the actual values of one or more of a function's inputs and/or outputs that occurred during tracing. This could include, for example, identifying values of one or more inputs and/or one or more outputs that were traced into a recorded execution 113 and/or causing one or more of functions to be replayed by the emulation component 116 in order to reproduce the values of one or more inputs and/or one or more outputs that occurred during tracing (e.g., to obtain values that may not have been traced into the recorded execution 113).

For a given function, the load identification component 115c identifies one or more loads that are performed within the function. An identified load could load a value from a memory location, load a value from a register location, or load a value from some other memory. In embodiments, an identified load could be addressed to one of the function's inputs; thus, it would be load from the location of the input prior to the function having performed a store to the location of the input. In this case, the load would expect to obtain data external to the function. In other situations, a load may be to data that is internal to the function. For example, the load could be addressed to a location that previously corresponded to an input, but subsequent to the function having performed one or more stores to that location (thus, the location is no longer an input at the time of the load). In another example, the load could be addressed to a location that did not correspond to any input, but subsequent to the function having performed one or more stores to that location (e.g., a variable/data structure that allocated by the function).

While the load identification component 115c might identify all of the loads within a given function, the load identification component 115c could potentially identify only those loads in which the value(s) of the load(s) can be traced to the value(s) of the function's outputs. Thus, for example, the load identification component 115c might perform a "reverse taint" analysis of the function, starting with a function's output, to identify data continuity between one or more loads and the output. For instance, starting with a particular output, the load identification component 115c could analyze a sequence of executable instructions of the function identify an instruction that preforms a store that placed the function's output value into the output. Then, the load identification component 115c could identify executable instructions corresponding to one or more first load(s) that were used to produce the output value written by this store. Each of these first load(s) can then be identified by the load identification component 115c a load that contributed to the output. The process can then be repeated for each memory location corresponding to each first load, to identify executable instructions corresponding to second load(s) that contributed to the value(s) read by the first load(s). This process can be repeated any number of times to identify a set of one or more loads that contributed the value of the particular output.

In embodiments, the load identification component 115c operates to identify loads that may read data affected by a data race, and omit loads that are not likely to read data affected by a data race. Thus, the load identification component 115c might use one or more heuristics to classify loads based on the relative likelihood that their target memory could be used by multiple threads. Such heuristics might be aided by debugging symbols, if they are available. For example, if a load within a given function is to a memory location corresponding to the function's stack, or to a constant, it is probably not likely that the data read by the load would be affected by a data race. Thus, the load identification component 115c might omit this load from the identified loads. In contrast, if a load within a given function is to a memory location corresponding to heap memory, or to a global variable, it might be possible that that the load was affected by a data race. Thus, the load identification component 115c might include this load in the identified loads. In embodiments, stack memory might even be tracked more granularly. For example, embodiments might determine if a pointer to a stack address for a given function has been taken by another function. If so, that address might be more likely to be affected by a data race than another stack address that was not taken by another function. In addition, a function that has had no stack address taken by another function is less likely to suffer from a data race than a function that has had one or more stack addresses taken by another function. As mentioned, a recorded execution 113 might include sequencing events. In embodiments, the load identification component 115c might take these sequencing events into account. For instance, if a load corresponds to a sequencing event then it may likely be part of a cross-thread synchronization events Thus, this load may be less likely to be part of a data race, and the load identification component 115c might omit this load in the identified loads, or at least flag it as being less likely to be part of a data race than other loads. In embodiments, the load identification component 115c might operate based, at least part, on user input. For example, the load identification component 115c might receive user input specifying a particular load of interest, might receive user input specifying a variable or data structure of interest, etc.

For each load identified, the load value identification component 115d can identify one or more substitute values for the load. Each substitute value is a value that might be artificially used as a value obtained by the load during emulation of the load by the emulation component 116. The load value identification component 115d might operate separately from emulation by the emulation component 116 and/or in connection with emulation by the emulation component 116. Thus, for example, the load value identification component 115d might identify substitute value(s) for one or more loads in a given function prior to emulation of the function, and/or during emulation of the function.

The load value identification component 115d could choose from a variety of approaches for determining what value to substitute for a particular load. For example, the load value identification component 115d could prompt for user input to obtain a value from a user, or could choose a random value. The load value identification component 115d could alternatively perform an analysis of the function to identify an appropriate substitute value. For example, if trace data for multiple prior-executed instances of the function is available, the load value identification component 115d might analyze these multiple instances to identify the values what were read by each of the multiple instances of the function of a given load. Then, for a given instance of the function and for this load, the load value identification component 115d could choose a substitute value that is typical for the load (e.g., if attempting to simulate correction of a data race), or choose a substitute value that is atypical for the load (e.g., if attempting to simulate introduction of a data race).

Figure 5:
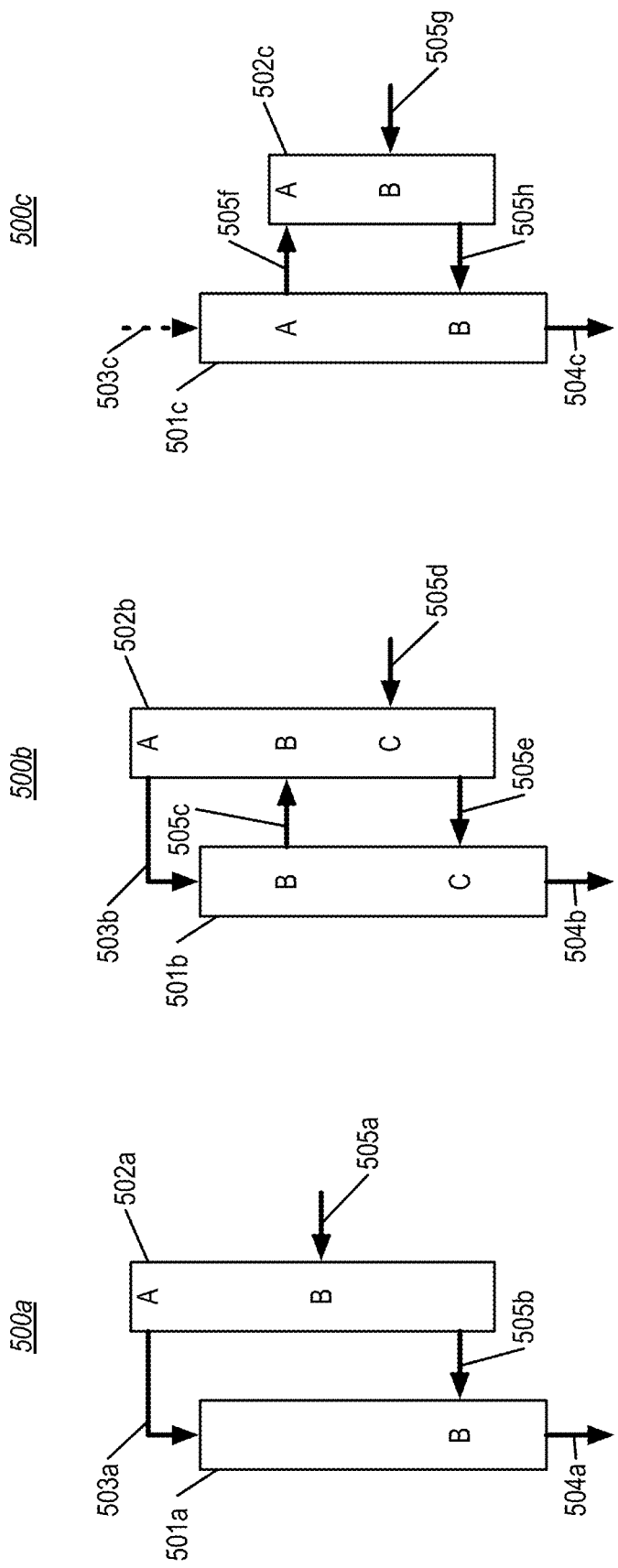
FIGS. 5A-5C illustrate examples of potential data race situations.

In another example, the load value identification component 115d might perform an analysis of the flow of data within a function, in connection with trace data, to determine what value to substitute. To illustrate this concept, FIGS. 5A-5C illustrate examples 500a-500c of potential data race situations. As was mentioned when describing the load identification component 115c, an identified load could be addressed, for example, to a memory location corresponding to a function's input, to a memory location that was formerly an input, or to a memory location that did not correspond to an input.

Example 500a illustrates a load from a memory location corresponding to a function's input. In particular, rectangle 501a represents execution of a function over time—starting at the top of the rectangle 501a consuming input(s) and ending at the bottom of the rectangle producing outputs 504a. Rectangle 502a, on the other hand, represents a memory location over time. Thus, at entry of the function, the value of the memory location is shown as "A," with that value being used as an input to the function. Arrows 505a and 505b represent some possible loads and stores to the memory location during execution of the function (though there could be others). As shown, at the time of a store at arrow 505a the value "B" is written to the memory location by something other than the function (e.g., another thread of the same process, a kernel thread, DMA, etc.). This value is later read by the function at arrow 505b. As will be appreciated, the store at arrow 505a may have been intentional (in which case the value "B" would be expected by the function at the time of the load at arrow 505b), but it could also have been due to a data race (in which case the value "A" would be expected by the function at the time of the load at arrow 505b). Given this situation, the load value identification component 115d might choose to substitute the value "A" into the load at arrow 505b. In this case, this might be an attempt to simulate correction of a data race. Notably, if the store at arrow 505a was not present in the trace, the load value identification component 115d might choose to substitute some other value into the load at arrow 505b in an attempt to simulate introduction of a data race.

Example 500b illustrates a load from a memory location that was formerly an input. In particular, rectangle 501b represents execution of a function over time—starting at the top of the rectangle consuming input(s) 503b and ending at the bottom of the rectangle producing outputs 504b. Rectangle 502b represents a memory location over time. Thus, at entry of the function, the value of the memory location is shown as "A," with that value being used as an input to the function. Arrows 505c-505d represent some possible loads and stores to the memory location during execution of the function (though there could be others). As shown, at the time of a store at arrow 505c the function writes the value "B" to the memory location. Later, at arrow 505d the value "C" is written to the memory location by something other than the function (e.g., another thread of the same process, a kernel thread, DMA, etc.). This value is later read by the function at arrow 505e. As will be appreciated, the store at arrow 505d may have been intentional (in which case the value "C" would be expected by the function at the time of the load at arrow 505e), but it could also have been due to a data race (in which case the value "B" would be expected by the function at the time of the load at arrow 505e). Given this situation, the load value identification component 115d might choose to substitute the value "B" into the load at arrow 505e. In this case, this might be an attempt to simulate correction of a data race. Notably, if the store at arrow 505d was not present in the trace, the load value identification component 115d might choose to substitute some other value into the load at arrow 505e in an attempt to simulate introduction of a data race.

Example 500c illustrates a load from a memory location that did not correspond to an input. In particular, rectangle 501c represents execution of a function over time—starting at the top of the rectangle consuming input(s) 503c (if any) and ending at the bottom of the rectangle producing outputs 504c. Rectangle 502c represents a memory location over time. Arrows 505f-505h represent some possible loads and stores to the memory location during execution of the function (though there could be others). As shown, at the time of a store at arrow 505f the function writes the value "A" to the memory location. Later, at arrow 505g the value "B" is written to the memory location by something other than the function (e.g., another thread of the same process, a kernel thread, DMA, etc.). This value is later read by the function at arrow 505h. As will be appreciated, the store at arrow 505g may have been intentional (in which case the value "B" would be expected by the function at the time of the load at arrow 505h), but it could also have been due to a data race (in which case the value "A" would be expected by the function at the time of the load at arrow 505h). Given this situation, the load value identification component 115d might choose to substitute the value "A" into the load at arrow 505h. In this case, this might be an attempt to simulate correction of a data race. Notably, if the store at arrow 505g was not present in the trace, the load value identification component 115d might choose to substitute some other value into the load at arrow 505h in an attempt to simulate introduction of a data race.

Turning to the emulation component 116, the emulation component 116 emulates code accessed by the code access component 114b, based on one or more of the recorded executions(s) 113 accessed by the trace access component 114a. For instance, the emulation component 116 might comprise or utilize the emulation component 111 of FIG. 1A to emulate the accessed code. Using the emulation component 116, the debugging component 109 can replay one or more functions identified by the function identification component 115a, based on executing the code of the function while steering that code's execution using traced data values from a recorded execution 113 including, for example, one or more traced inputs that were identified by the inputs/outputs identification component 115b. Thus, the emulation component 116 is shown as including an emulation steering component 116a, which can supply code of any emulated function with traced data values, as needed, in order to steer the function's emulation to reproduce the function's traced execution.

The emulation component 116 is also shown as including a load substitution component 116b. In connection with emulation of a given function, the load substitution component 116b can substitute a value for one or more of the loads that were identified by the load identification component 115c with a value other than one that would be expected based on operation of the emulation steering component 116a. Thus, the load substitution component 116b might be viewed as producing exceptions to the steering by the emulation steering component 116a. The load substitution component 116b can produce an alternate load value for any of the categories of loads discussed above in connection with the load identification component 115c. For example, if the load was from a location corresponding to an input, the load substitution component 116b might substitute a value of the input that was obtained from the recorded execution 113, or that was obtained by replay of another function, with some other value. If the load was from a location that previously corresponded to an input, but was subsequently written to by the function, the load substitution component 116b might substitute the written value with some other value. If the load was from a location that did not correspond to any input, but subsequent to the function having performed one or more stores to that location, the load substitution component 116b might substitute the written value with some other value.

The emulation component 116 is also shown as including an output generation component 116c. The output generation component 116c indicates that code emulation will generate one or more output values during code emulation. For example, emulation of function 402-1 will produce outputs 404-1, emulation of function 402-2 will produce outputs 404-2, etc. If the emulation component 116 utilizes the emulation steering component 116a—but not the load substitution component 116b—then emulation of a given function will produce the same outputs and output values that occurred during tracing. Thus, the emulation steering component 116a can be utilized to obtain any outputs that may not have been recorded during tracing. If, however, the emulation component 116 also utilizes the load substitution component 116b, emulation of a function might deviate from how the function executed during tracing and it might produce different output values. Thus, for a given function, the output generation component 116c might be able to generate a set of one or more outputs whose value(s) are consistent with those that were produced during tracing, and one or more additional sets of outputs that could have different values depending on which loads within the function the load substitution component 116b performs substitutions on, and/or which values the load substitution component 116b substitutes.

Notably, when performing a replay (including one that does memory load substitutions), the emulation component 116 might leverage the tracer component 110 in order to record that emulation. Thus, the emulation component 116 can contribute additional traces to the recorded executions 113.

As was mentioned, a function might include gaps, such as a gap caused by call to a non-traced kernel call. In embodiments, the emulation component 116 can use one or more techniques to gracefully deal with any gaps. As a first example, the emulation component 116 might determine from an accessed recorded execution 113 what inputs were supplied to the kernel call, and then emulate the kernel call by the emulation component 116 based on those inputs. As a second example, the emulation component 116 might treat the kernel call as an event that can be ordered among other events in an accessed recorded execution 113, and rather than emulating the kernel call, the emulation component 116 can ensure that any visible changes made by the kernel call (e.g., changed memory values, changed register values, etc.) are exposed as inputs to code that executes after the kernel call. As a third example, the emulation component 116 might set up appropriate environmental context, and then make an actual call to a running kernel using these inputs. As a fourth example, emulation component might simply prompt a user for the results of a kernel call.

The emulation analysis component 117 can perform various types of analysis on the emulated execution of the accessed application(s) 112, including analyzing the effects of any load substitutions performed by the load substitution component 116b. This analysis could be used, for example, as part of a data race analysis, as will be discussed further. As shown, the emulation analysis component 117 might include, for example, an outputs comparison component 117a, a data race analysis component 117b, a classification component 117c, and/or a checker component 117d.

The outputs comparison component 117a can compare a set of outputs that were generated by a given function during tracing, with a set of outputs that were generated during replay of the function by the emulation component 116 while using load substitution component 116b substitutes the value(s) read by one or more of the function's loads. If there is any difference within these sets of outputs, the outputs comparison component 117a can determine that the load substitution had an effect on the output of the function. As mentioned, the set of outputs that were generated during replay might be obtained from the recorded execution 113, and/or based on emulation of the function by the emulation component 116 while the emulation steering component 116a steers the emulation using trace data.

Based on the comparison by the outputs comparison component 117a, the data race analysis component 117b can determine if the load substitution component 116b having substituted a value for a given load might have corrected a data race, or might have simulated a data race. If the outputs comparison component 117a found no difference in the set of traced outputs and the set of outputs generated during load substitution, then a substitution probably did not correct or simulate a data race (at least not in a detectible manner). If there was a difference in the sets of outputs, however, the substitution might have corrected or simulated a data race. In embodiments, the data race analysis component 117b can determine if the emulated set of outputs have normal, or abnormal, values. If correction of a race was simulated, and if the resulting outputs are normal, then it may be likely that there was indeed a race. Conversely, if correction of a race was simulated, and if the resulting outputs are abnormal, then perhaps there was not a race or the value used to simulate the correction was a poor choice. Similarly, if introduction of a race was simulated, observing if the outputs are normal or abnormal might indicate if the simulated race matches what might be occurring in production. For example, if the outputs remain normal, than perhaps this simulated race is not actually occurring in production. Conversely, if the outputs are abnormal, and if they are similar to abnormal results being observed in production, then the simulated race might be occurring in production.

In order to determine whether emulated outputs are normal or abnormal, the emulation analysis component 117 might include a classification component 117c. The classification component 117c can take as input the outputs of a number of traced instances of a given function. Then, the classification component 117c can look for patterns in the outputs (e.g., using machine learning techniques) to classify the various outputs as being normal or abnormal for the function. For example, the classification component 117c can determine which output values typically fall within a normal distribution from each other (and are thus are normal), and/or which outputs values fall outside of that distribution (and are thus abnormal). Regardless of the particular classification techniques used, the classification component 117c can develop a model for a given function that can be used to determine which output values are normal or abnormal for the function. In embodiments, the classification component 117c might also analyze the inputs of functions, and model which outputs are typical for given inputs.

The emulation analysis component 117 might also include a checker component 117d, which can perform one or more queries on the recorded executions 113—whether those recorded executions 113 be generated based on "live" code execution, or whether they be generated in connection with emulation. These queries can check for various types of code behaviors, such as memory leaks (e.g., by querying for any memory allocations that do not have a corresponding deallocation). In embodiments, the emulation analysis component 117 might run one or more checkers against a trace recorded based on the emulation component 116 performing memory load substitution. Thus, emulation analysis component 117 can determine if a memory load substitution causes (or ceases) a behavior this is detectable by the checker component 117d. The data race analysis component 117b might use the checker component 117d as part of determining if a memory load substitution might have corrected a data race or might have simulated a data race. For example, if an undesired behavior detectable by the checker component 117d is fixed after the memory load substitution, that might be an indication that the memory load substitution fixed a memory race. Conversely, if an undesired behavior detectable by the checker component 117d is introduced after the memory load substitution, that might be an indication that the memory load substitution caused a memory race.

The output component 118 can output the results of any code emulation by the emulation component 116 and/or the results of any analysis by the emulation analysis component 117. For example, the output component 118 might visualize code emulation (including load value substitution), might generate a notification (e.g., to another application or at a user interface) if the outputs comparison component 117a determines that emulated outputs are different than traced outputs, might present any differences between out traced an emulated outputs, etc.

Figure 6:
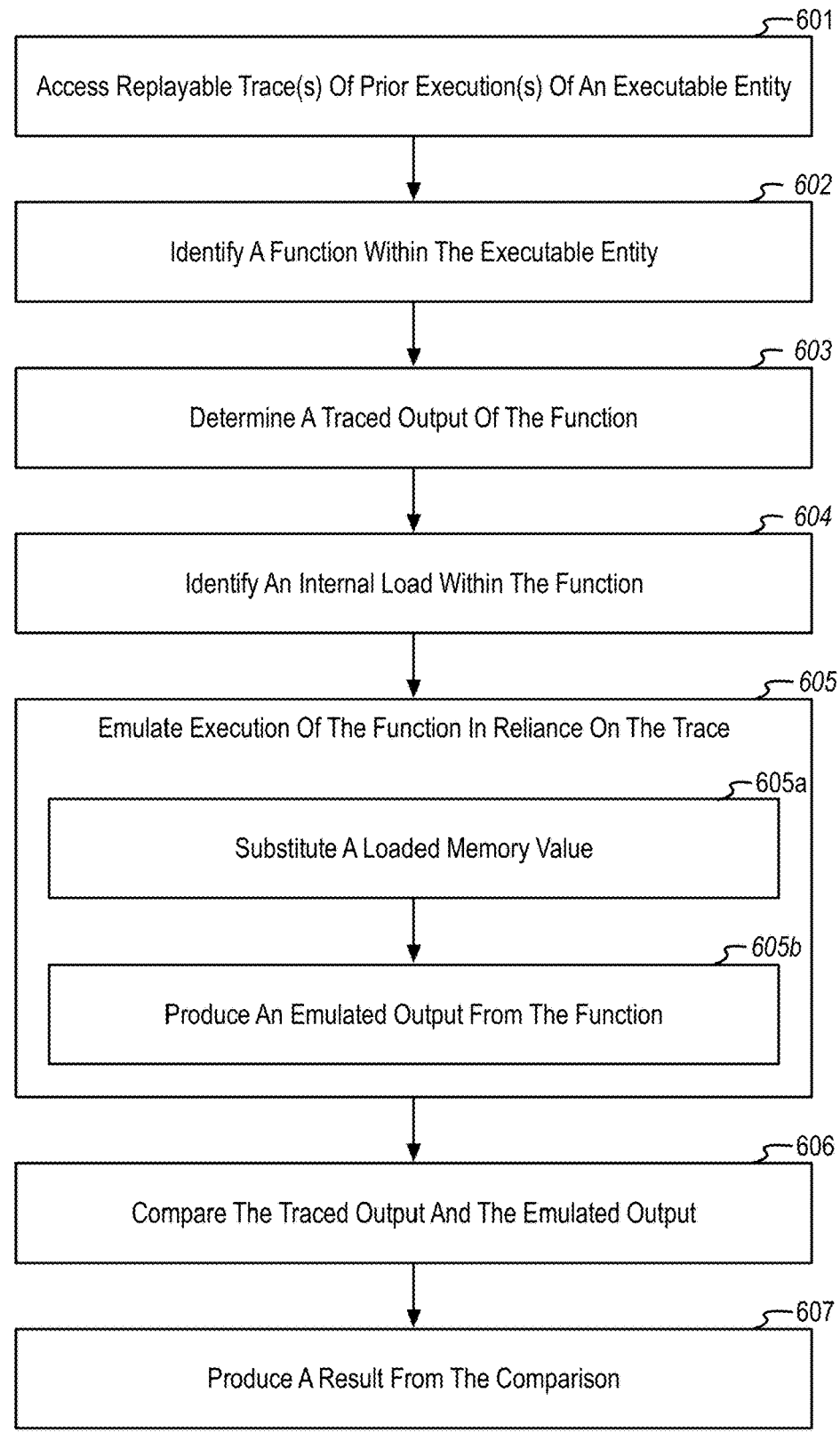
FIG. 6 illustrates a flowchart of an example method for using a recorded execution to determine whether a function-internal load modification affects the output of a traced function.

In view of the foregoing, FIG. 6 illustrates a flowchart of an example method 600 for using a recorded execution to determine whether a function-internal load modification affects one or more outputs of a traced function. Method 600 will now be described within the context of with FIGS. 1-5C. While, for ease in description, the acts of method 600 are shown in a particular sequential order, it will be appreciated that some of these acts might be implemented in different orders, and/or in parallel.

As shown in FIG. 6, method 600 includes an act 601 of accessing replayable trace(s) of prior execution(s) of an executable entity. In some embodiments, act 601 comprises accessing a recorded execution comprising trace data tracing a prior execution of at least a portion of executable code of an executable entity, the trace data enabling replay of the prior execution the portion of the executable entity. For example, the data access component 114 can access one or more of recorded executions 113 of an application 112 (e.g., using the trace access component 114a). As shown in FIG. 3, each of these recorded execution(s) 113 might include at least one data stream 301a that includes a plurality of data packets 302; each data packet 302 can include a data inputs portion 304 that records inputs to executable instructions that executed as part of the prior execution of the application. The recorded execution(s) 113 can include prior "live" executions of the application 112 at the processor(s) 102 directly, or through a managed runtime, or prior emulated executions of the application 112 using the emulation component 116. As such, in act 601, the one or more recorded executions 113 could comprise at least one of a "live" execution of the executable entity, or an emulated execution of the executable entity.

Method 600 also includes an act 602 of identifying a function within the executable entity. In some embodiments, act 602 comprises identifying a function within the traced portion of executable code of the executable entity, the function comprising a sequence of executable instructions, the function consuming zero or more inputs and producing one or more outputs. For example, the function identification component 115a can analyze code of the application 112 (e.g., as contained in an application binary and/or a trace data stream) to identify one or more functions in the code. As discussed, a function is a sequence of executable instructions that has zero or more inputs, and one or more outputs, using the definitions of inputs and outputs herein.

Method 600 also includes an act 603 of determining a traced output of the function. In some embodiments, act 603 comprises, based on the trace data, determining one or more traced output data values that were produced by a traced instance of the function during the prior execution. For example, the inputs/outputs identification component 115b can identify one or more outputs the function identified in act 602, including the output value(s) for a subject instance of the function. An output value might be obtained from a recorded execution 113 directly, or based on replay of the function using the emulation component 116 (in connection with the emulation steering component 116a). Although not shown, method 600 might also use the input/outputs identification component 115b to determine one or more traced input data values (if any) that were provided to the traced instance of the function during the prior execution.

Method 600 also includes an act 604 of identifying an internal load within the function. In some embodiments, act 604 comprises identifying, within the sequence of executable instructions of the function, at least one executable instruction that performs a load from memory. For example, the load identification component 115c can analyze the executable instructions of the function to identify one or more loads within the functions. These loads could be, for example, targeted at system memory, registers, etc. In embodiments, the load identification component 115c specifically identifies executable instruction(s) that perform a load from memory that may be subject to a memory race. For example, these loads might be targeted at heap memory, a global variable, or other memory locations that could be accessed by multiple threads. In embodiments, the load identification component 115c identifies only those loads that could affect a value of the output(s) identified in act 603. Thus, the load identification component 115c might perform a "reverse taint" analysis of the sequence of executable instructions to identify loads that have data continuity with the output(s).

Method 600 also includes an act 605 of emulating execution of the function in reliance on the trace. For example, the emulation component 116 can emulate the sequence of executable instructions of the function, while steering their execution using the emulation steering component 116a, together with the trace data contained in the accessed recorded execution 113. Thus, the emulation component 116 can reproduce a prior execution of the function, as recorded in the recorded execution 113. Although not shown, act 605 could include, while emulating execution of the function in reliance on the trace data, providing the function with the one or more traced input data values for one or more inputs (if any).

While use of the emulation steering component 116a can replay a prior execution, the emulation component 116 can also modify that replay by substituting a traced value a load with a different value, such as a value identified by the load value identification component 115d. Thus, as shown, act 605 can include an act 605a of substituting a loaded memory value. In some embodiments, act 605a comprises substituting a traced memory value loaded by the at least one executable instruction during the traced instance of the function with a different memory value. For example, when emulating the load identified in act 604, the load substitution component 116b can substitute a value that would have been used based on the recorded execution 113 with a different value identified by the load value identification component 115d. This could, for example, include substituting the traced memory value with a memory value from one or more traced input data values (e.g., to simulate correcting a data race), or substituting the traced memory value with some other memory value. As shown, act 605 can include an act 605b of producing an emulated output from the function. Thus, as represented by the output generation component 116c, the emulation component 116 can produce one or more emulated output data values for the one or more outputs.

As will be appreciated, due to use of the load substitution component 116b, these outputs may be different than the outputs that would have been generated by a standard replay of the function. Thus, method 600 includes an act 606 of comparing the traced output and the emulated output. In some embodiments, act 606 comprises determining if there is a difference between the one or more traced output data values and the one or more emulated output data values. For example, the outputs comparison component 117a can compare the output values obtained in act 603 with the output values generated in act 605b. Then, method 600 also includes an act 607 of producing a result from the comparison. The result could be that the outputs are the same, or that the outputs are different. If the outputs are different, act 607 could comprise, based on there being a difference between the one or more traced output data values and the one or more emulated output data values, generating a notification at a user interface or to a software component. If the notification is generated to a software component (which could include, for example, calling a function), act 607 could comprise determining whether the one or more emulated output data values are normal or abnormal for the function, determining whether one or more checkers are affected by substituting the traced memory value with the different memory value, etc. For example, the output component 118c might generate an alert about differences and/or with the results of any analysis by the data race analysis component 117b, the data race analysis component 117b could determine if the emulated outputs are normal or abnormal (e.g., using the classification component 117c), the data race analysis component 117b could determine if the load substitution caused a change in a checker (e.g., using the checker component 117d), etc.

If, in act 607, the data race analysis component 117b determines whether the one or more emulated output data values are normal or abnormal for the function, the determination might compare the one or more emulated output data values with traced output values from one or more other traced instances of the function, such by using the classification component 117c. If, in act 607, the data race analysis component 117b determines that the one or more emulated output data values are normal for the function, method 600 might include the data race analysis component 117b determining that substituting the traced memory value with the different memory value corrects a potential race condition. Alternatively, if, in act 607, the data race analysis component 117b determines that the one or more emulated output data values are abnormal for the function, method 600 could include the data race analysis component 117b determining that substituting the traced memory value with the different memory value introduced a potential race condition. If, in act 607, the output component 118 generates the notification, the notification might cause a user interface to present the one or more traced output data values and the one or more emulated output data values.

Accordingly, the embodiments herein leverage historic debugging technologies to substitute the value of a load within a function during the functions' replay, in order to observe the effect of the substitution on the function's output(s). Modifying the value read by a given load might operate to simulate the occurrence of a data race. Thus, a debugger can observe effects a simulated data race might have on the behavior of a function, even when a data race did not actually occur during tracing. As such, the debugger can enable simulation of a data race in a function when a race might be suspected, but has not been captured during tracing. Alternatively, modifying the value read by a given load might operate to simulate the correction of a data race. Thus, the debugger can observe the effects of a simulated correction of a data race might have on the behavior of a function when a data race was captured during tracing. This can reduce the time spent in development, troubleshooting, and debugging and resulting the production of less error-prone code.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes one or more processors and a memory, for using a recorded execution to determine whether a function-internal load modification affects one or more outputs of a traced function, the method comprising:
   accessing a recorded execution comprising trace data tracing a prior execution of at least a portion of executable code of an executable entity, the trace data enabling replay of the prior execution the portion of the executable entity;
   identifying a function within the traced portion of executable code of the executable entity, the function comprising a sequence of executable instructions, the function consuming zero or more inputs and producing one or more outputs;
   based on the trace data, determining one or more traced output data values that were produced by a traced instance of the function during the prior execution;
   identifying, within the sequence of executable instructions of the function, at least one executable instruction that performs a load from memory;
   emulating execution of the function in reliance on the trace data, including:
      substituting a traced memory value loaded by the at least one executable instruction during the traced instance of the function with a different memory value; and
      producing one or more emulated output data values for the one or more outputs;
   determining if there is a difference between the one or more traced output data values and the one or more emulated output data values; and
   based on there being a difference between the one or more traced output data values and the one or more emulated output data values, generating a notification at a user interface or to a software component.

2. The method of claim 1, wherein identifying the at least one executable instruction that performs the load from the memory comprises identifying an executable instruction that performs a load from memory that may be subject to a memory race.

3. The method of claim 1, wherein identifying the at least one executable instruction that performs the load from the memory comprises identifying a data continuity between the load and the one or more outputs based on an analysis of the sequence of executable instructions.

4. The method of claim 1, wherein the method generates the notification to the software component and wherein, based on the notification, the method determines whether the one or more emulated output data values are normal or abnormal for the function, the determining comprising comparing the one or more emulated output data values with traced output values from one or more other traced instances of the function.

5. The method of claim 1, wherein the method generates the notification to the software component and wherein, based on the notification, the method determines that the one or more emulated output data values are normal for the function, the method further comprising determining that substituting the traced memory value with the different memory value corrects a potential race condition.

6. The method of claim 1, wherein the method generates the notification to the software component and wherein, based on the notification, the method determines that the one or more emulated output data values are abnormal for the function, the method further comprising determining that substituting the traced memory value with the different memory value introduced a potential race condition.

7. The method of claim 1, wherein the method generates the notification at the user interface, the notification causing the user interface to present the one or more traced output data values and the one or more emulated output data values.

8. The method of claim 1, wherein the method generates the notification to the software component and wherein, based on the notification, the method determines whether one or more checkers are affected by substituting the traced memory value with the different memory value.

9. The method of claim 1, wherein substituting the traced memory value with the different memory value comprises substituting the traced memory value with a memory value from one or more traced input data values.

10. The method of claim 1, further comprising:
based on the trace data, determine one or more traced input data values for one or more inputs that were provided to a traced instance of the function during the prior execution; and
while emulating execution of the function in reliance on the trace data, providing the function with the one or more traced input data values for the one or more inputs.

11. A computer system, comprising:
one or more processors; and
one or more computer-readable media having stored thereon computer-executable instructions that are executable by the one or more processors to cause the computer system to use a recorded execution to determine whether a function-internal load modification affects one or more outputs of a traced function, the computer-executable instructions including instructions that are executable by the one or more processors to at least:

access a recorded execution comprising trace data tracing a prior execution of at least a portion of executable code of an executable entity, the trace data enabling replay of the prior execution the portion of the executable entity;
identify a function within the traced portion of executable code of the executable entity, the function comprising a sequence of executable instructions, the function consuming zero or more inputs and producing one or more outputs;
based on the trace data, determine one or more traced output data values that were produced by a traced instance of the function during the prior execution;
identify, within the sequence of executable instructions of the function, at least one executable instruction that performs a load from memory;
emulate execution of the function in reliance on the trace data, including:
substituting a traced memory value loaded by the at least one executable instruction during the traced instance of the function with a different memory value; and
producing one or more emulated output data values for the one or more outputs;
determine if there is a difference between the one or more traced output data values and the one or more emulated output data values; and
based on there being a difference between the one or more traced output data values and the one or more emulated output data values, generating a notification at a user interface or to a software component.

12. The computer system of claim 11, wherein identifying the at least one executable instruction that performs the load from the memory comprises identifying an executable instruction that performs a load from memory that may be subject to a memory race.

13. The computer system of claim 11, wherein identifying the at least one executable instruction that performs the load from the memory comprises identifying a data continuity between the load and the one or more outputs based on an analysis of the sequence of executable instructions.

14. The computer system of claim 11, wherein the computer system generates the notification to the software component and wherein, based on the notification, the computer system determines whether the one or more emulated output data values are normal or abnormal for the function, the determining comprising comparing the one or more emulated output data values with traced output values from one or more other traced instances of the function.

15. The computer system of claim 11, wherein the computer system generates the notification to the software component and wherein, based on the notification, the computer system determines that the one or more emulated output data values are normal for the function, including determining at least one of:
that substituting the traced memory value with the different memory value corrects a potential race condition; or
that substituting the traced memory value with the different memory value introduced a potential race condition.

16. The computer system of claim 11, wherein the computer system generates the notification at the user interface, the notification causing the user interface to present the one or more traced output data values and the one or more emulated output data values.

17. The computer system of claim 11, wherein the computer system generates the notification to the software component and wherein, based on the notification, the computer system determines whether one or more checkers are affected by substituting the traced memory value with the different memory value.

18. The computer system of claim 11, wherein substituting the traced memory value with the different memory value comprises substituting the traced memory value with a memory value from one or more traced input data values.

19. The computer system of claim 11, the computer-executable instructions also including instructions that are executable by the one or more processors to:
   based on the trace data, determine one or more traced input data values for one or more inputs that were provided to a traced instance of the function during the prior execution; and
   while emulating execution of the function in reliance on the trace data, provide the function with the one or more traced input data values for the one or more inputs.

20. A computer program product comprising one or more hardware storage devices having stored thereon computer-executable instructions that are executable by one or more processors to cause a computer system to use a recorded execution to determine whether a function-internal load modification affects one or more outputs of a traced function, the computer-executable instructions including instructions that are executable by the one or more processors to at least:
   access a recorded execution comprising trace data tracing a prior execution of at least a portion of executable code of an executable entity, the trace data enabling replay of the prior execution the portion of the executable entity;
   identify a function within the traced portion of executable code of the executable entity, the function comprising a sequence of executable instructions, the function consuming zero or more inputs and producing one or more outputs;
   based on the trace data, determine one or more traced output data values that were produced by a traced instance of the function during the prior execution;
   identify, within the sequence of executable instructions of the function, at least one executable instruction that performs a load from memory;
   emulate execution of the function in reliance on the trace data, including:
      substituting a traced memory value loaded by the at least one executable instruction during the traced instance of the function with a different memory value; and
      producing one or more emulated output data values for the one or more outputs;
   determine if there is a difference between the one or more traced output data values and the one or more emulated output data values; and
   based on there being a difference between the one or more traced output data values and the one or more emulated output data values, generate a notification at a user interface or to a software component.

* * * * *